(12) United States Patent
Graves et al.

(10) Patent No.: US 9,810,862 B2
(45) Date of Patent: Nov. 7, 2017

(54) FREE SPACE OPTICAL (FSO) SYSTEM

(71) Applicant: SA Photonics, Inc., Los Gatos, CA (US)

(72) Inventors: J. Elon Graves, Los Gatos, CA (US); William Dickson, Granville, OH (US); Greg Mitchell, Elk Grove, CA (US); Andy McClaren, Santa Cruz, CA (US); Dave Pechner, San Jose, CA (US)

(73) Assignee: SA Photonics, Inc., Los Gatos, CA (US)

( * ) Notice: Subject to any disclaimer, the term of this patent is extended or adjusted under 35 U.S.C. 154(b) by 0 days.

(21) Appl. No.: 15/243,858

(22) Filed: Aug. 22, 2016

(65) Prior Publication Data

US 2017/0052334 A1    Feb. 23, 2017

Related U.S. Application Data

(60) Provisional application No. 62/208,561, filed on Aug. 21, 2015, provisional application No. 62/208,565, filed on Aug. 21, 2015, provisional application No. 62/348,342, filed on Jun. 10, 2016.

(51) Int. Cl.
*G02B 6/32* (2006.01)
*G02B 6/42* (2006.01)
*H04B 10/112* (2013.01)

(52) U.S. Cl.
CPC ............ *G02B 6/4206* (2013.01); *G02B 6/32* (2013.01); *G02B 6/422* (2013.01); *H04B 10/1123* (2013.01)

(58) Field of Classification Search
CPC ........ G02B 6/4206; G02B 6/422; G02B 6/32; H04B 10/11
See application file for complete search history.

(56) References Cited

U.S. PATENT DOCUMENTS

| | | | |
|---|---|---|---|
| 4,518,854 A | 5/1985 | Hutchin | |
| 6,535,314 B1 | 3/2003 | Mendenhall et al. | |
| 7,406,263 B2 | 7/2008 | Graves et al. | |
| 7,551,121 B1* | 6/2009 | O'Connell | F41G 5/08 235/400 |
| 7,809,278 B2 | 10/2010 | Morris et al. | |
| 8,525,091 B2 | 9/2013 | Cui et al. | |
| 8,660,312 B2 | 2/2014 | Cui et al. | |
| 2001/0006210 A1 | 7/2001 | Yanagi et al. | |
| 2004/0086282 A1 | 5/2004 | Graves et al. | |

(Continued)

FOREIGN PATENT DOCUMENTS

EP    1806858 A1    7/2007

OTHER PUBLICATIONS

PCT International Search Report and Written Opinion, PCT Application No. PCT/US16/48086, dated Nov. 4, 2016, 7 pages.

(Continued)

*Primary Examiner* — Ryan Lepisto
(74) *Attorney, Agent, or Firm* — Fenwick & West LLP (57) ABSTRACT

A detector configuration for use in a free space optical (FSO) node for transmitting and/or receiving optical signals has a plurality of sensors for detecting received optical signals. The system may be configured to modify or alter the light at the plurality of sensor to optimize different system functions.

13 Claims, 6 Drawing Sheets

(56) References Cited

U.S. PATENT DOCUMENTS

| | | |
|---|---|---|
| 2007/0035855 A1* | 2/2007 | Dickensheets ....... A61B 5/0068 |
| | | 359/819 |
| 2011/0149298 A1 | 6/2011 | Arieli et al. |
| 2012/0248347 A1 | 10/2012 | Renna et al. |
| 2013/0100792 A1 | 4/2013 | Nakamura |
| 2015/0188628 A1* | 7/2015 | Chalfant, III .......... G02B 13/22 |
| | | 398/131 |
| 2015/0215040 A1 | 7/2015 | Dickson et al. |
| 2015/0215041 A1 | 7/2015 | Pechner |

OTHER PUBLICATIONS

PCT International Search Report and Written Opinion, PCT Application No. PCT/US16/48091, dated Nov. 15, 2016, 9 pages.
U.S. Appl. No. 62/238,637, filed Oct. 7, 2015.
U.S. Appl. No. 62/266,710, filed Dec. 14, 2015.

* cited by examiner

PRIOR ART

FREE SPACE OPTICAL (FSO) SYSTEM

PRIORITY

This application claims priority to U.S. Application No. 62/208,561, filed Aug. 21, 2015, U.S. Application No. 62/208,565, filed Aug. 21, 2015, and U.S. Application No. 62/348,342, filed Jun. 10, 2016, each of which is incorporated by reference in its entirety into this application.

BACKGROUND

Figure 1:
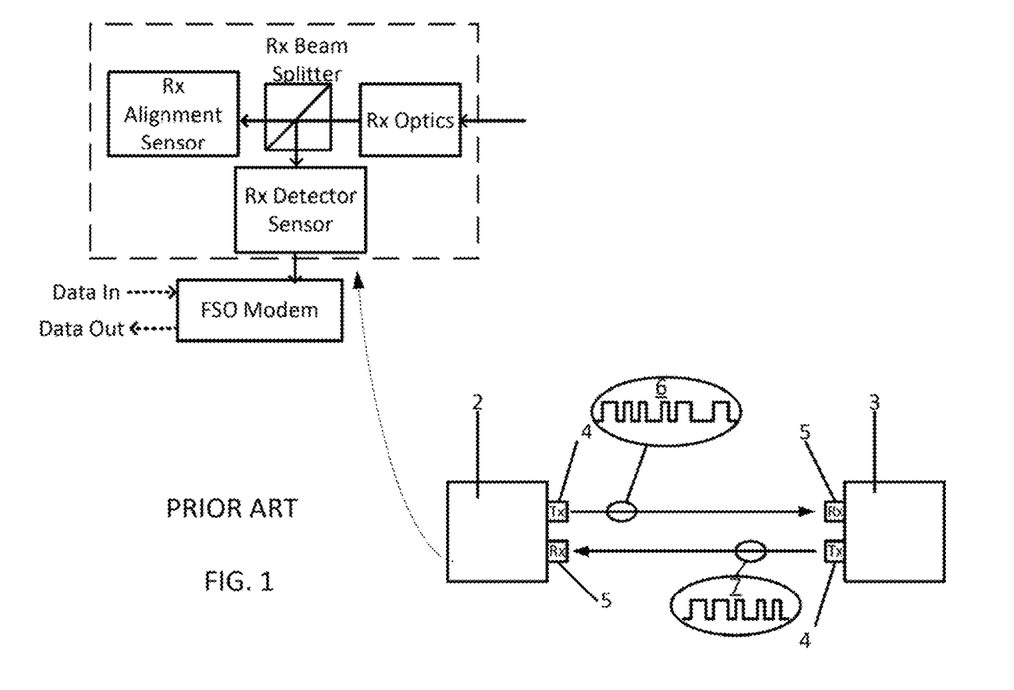
FIG. 1 illustrates and exemplary prior art free space optical system.

In a two-node bi-directional Free Space Optical (FSO) communication system, the two FSO nodes exchange data encoded on optical carrier beams sent across an unobstructed line of sight (LOS) between the two nodes. As shown in FIG. 1, a conventional two-node bi-directional system is illustrated. As shown, a first node 2 and a second node 3 communicate by transmitting and receiving a signal 6, 7 sent between the nodes. The data can be encoded on the signals in any matter; a binary, on-off, exemplary signal is illustrated for simplicity. Each node has an optical output 4 for transmitting the desired signal 6, 7, and also an optical input 5 for receiving the transmitted signal. Once received, the internal electronics of the node can decode the signal and obtain the transmitted data.

The communication system only works if the transmit path of the first node is aligned with the receiving components of the second node. In order to optimize tracking, conventional systems have split the received beam into two paths: one for detection and one for alignment. As shown in FIG. 1, the exemplary system uses a beam splitter and separate detectors as an alignment sensor and as a detector (processing) sensor. The resulting system is complex as it requires beam splitting and multiple paths to perform each function (e.g. alignment and detecting). Errors are also introduced into the system through the misalignment and/or drift between the multiple paths.

SUMMARY

A free space optical node is described including using a diffractive optical element in order to reduce the alignment responses based on atmospheric scintillation of an optical beam. In an exemplary embodiment, the diffractive optical element may be configured to produce two concentric or overlapping mirror images at a focal plane. In an exemplary embodiment, the diffractive optical element may be configured to shape a beam by smoothing its intensity profile across the beam.

Exemplary embodiments include a free space optical node having a fiber coupled to receiving electronics and transmitting electrics, wherein a terminal end of the transmit/receiver fiber is positioned at a focal plane, and a differential wave front sensor positioned at a second plane. The first plane may be the same or different than the second plane. The free space optical node may also include fore optics configured to create defocussed image. In an exemplary embodiment the defocused image includes at least two overlapping images at the second plane. In an exemplary embodiment, the two overlapping images are mirror opposites.

Exemplary embodiments include a free space optical terminal having a wave front sensor comprising a free space in a center region of the wave front sensor, an active surface of the wave front sensor defining a plane; an optical fiber have a terminal end positioned in the plane and aligned with the free space of the wave front sensor; and fore optics positioned before the wave front sensor to direct light through the fore optics substantially all of the light through the fore optics onto active areas of the wave front sensor, the optical fiber, and combinations thereof. Exemplary embodiment have other optics in place of the optical fiber for handing the receipt and/or transmission of a communications beam.

DESCRIPTION

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

Exemplary embodiments may be used to greatly simplify the complexity of a free space optical (FSO) terminal, while maintaining the benefit achieved by separate alignment and detection sensors. Accordingly, exemplary FSO terminals according to embodiments described herein include separate detection sensor(s) and alignment sensor(s) configured or positioned such that the received optical path is maintained as a single received optical path. Accordingly, exemplary embodiments may reduce misalignment of the system by not subdividing the paths to the separate detectors. An exemplary FSO terminal may be capable of unidirectional or bi-directional high bandwidth optical communications.

Although embodiments of the invention may be described and illustrated herein in terms of an alignment sensor and detection sensor, it should be understood that embodiments of this invention are not so limited, but are additionally applicable to functional components of the system. For example, the respective sensors may be used for other purposes. Accordingly, exemplary embodiments may be used when it is desired to have two system components using portions of the same free space signal and it is desired to keep the components along the same signal path and not split the signal into separate paths. Accordingly, the detector and alignment sensors described herein may be used for any system function. Moreover, exemplary embodiments may be adapted to other free space systems, not necessarily limited to optical applications or communication systems.

Figure 2:
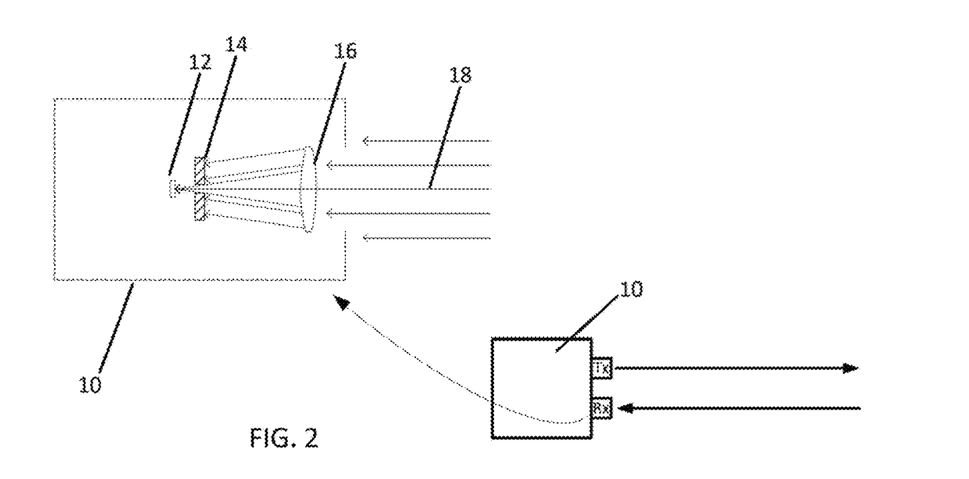
FIG. 2 illustrates an exemplary FSO node according to embodiments described herein with a portion of its system components shown for illustration.

U.S. application Ser. No. 15/243,800, filed concurrently herewith, is incorporated by reference in its entirety herein, and describes exemplary embodiments in which separate alignment and detection sensors may be used along the same optical path to perform different functions. FIG. 2 illustrates an exemplary embodiment of this system in which an exemplary FSO node 10 includes a detecting sensor 12 along the same optical path (receiving beam path 18) as the alignment sensor 14. In an exemplary embodiment, the alignment is achieved by incorporating a hole, aperture, or passage in the alignment sensor 14 such that a portion of the received beam falls on the alignment sensor and a portion of the receive beam falls on the detecting sensor 12. As described, the alignment sensor comprises a plurality of detecting surfaces to provide a differential detecting plane.

Figure 3:
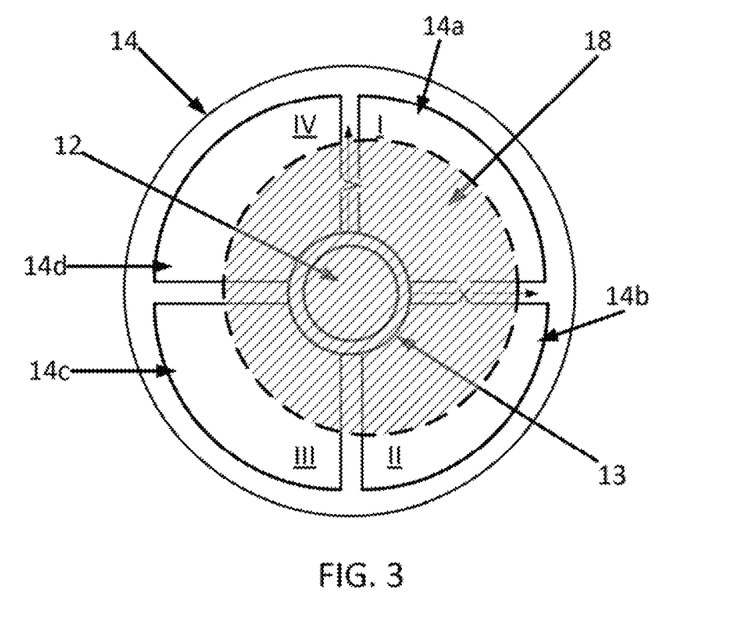
FIG. 3 illustrates and exemplary front elevation view of a sensor configuration according to embodiments described herein.

FIG. 3 illustrates and exemplary front elevation view of the detection sensor 12 and alignment sensor 14 having a common optical receive path as seen elevated from a direction normal the detection surface, where the plurality of detecting surfaces of the alignment sensor is defined by the different cells of a quadcell sensor. To permit the dual detection purpose of alignment and detection, the quad cell of the alignment sensor has a central aperture to pass a portion of the optical signal to receiving optics to the detection sensor.

Because the aperture in the central portion of the alignment sensor, the sensitivity of the system to variations in the received signal periphery becomes more significant. For example, in terrestrial applications, atmospheric effects can influence and/or obstruct portions of the optical signal. If the changes are at the peripheral edge of the signal beam, these obstructions or scintillation will cause the system to detect a misalignment and attempt realignment even if the system is not misaligned. For example, if looking at FIG. 3, if a portion of the received optical signal 18 is obstructed or otherwise effected, thereby reducing the detected signal at quadrant 14a, the system may attempt to realign the system to move the beam toward quadrant I, in contradiction to the direction is should be moved based on the received beam column.

Moreover, as seen in FIG. 3, the plurality of detectors includes dead space between the alignment sensor and the receiver and between the plurality of detectors of the alignment sensor. If the receiver is an optical fiber, then the dead space includes the cladding around the fiber in addition to the space between components. This dead space reduces the received signals to the plurality of sensors and exaggerates the response to scintillation. In an exemplary embodiment, the alignment sensor 14 comprises a plurality of sensors or sensor sections. The plurality of sensors circumscribing the receiver 12 (optical fiber or detector) includes dead zones or gaps between the active sensor surfaces.

Figure 4:
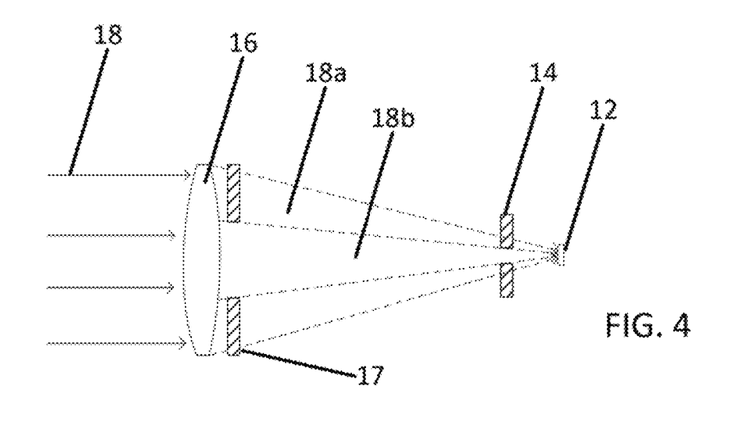
FIG. 4 illustrates an exemplary partial FSO system according to embodiments described herein.

As seen in FIG. 4, an optical component may be incorporated to reduce the external effects not relevant to beam column alignment of the received signal. The optical component 17 may be used to overcome or reduce one or more of the issues described herein including loss of intensity from dead zones or effects from scintillation. The system may include a receptor (such as a detector or optical fiber) and an alignment sensor 14. The incoming light 18 encounters a focusing optic 16 that focuses the light onto the receptor 12. The peripheral edge of the focused light is received at alignment sensor 14. Therefore, the interior portion of the light 18b is detected by receptor 12 and the exterior portion 18a is detected by alignment sensor 14. The exterior portion 18a may include additional optics 17. The optical component 17 may, for example, include a diffuser, phase screen, lens, and combinations thereof as described herein. The optical component 17 may be used to spread, focus, redirect, modify, or combinations thereof, the signal across the usable portion of the alignment sensor and reduce the effects from scintillation or otherwise improve system performance. The annular area around the transmit beam is captured by the alignment sensor, such as the quadcell with a hole, for guiding and alignment with improved efficiency and accuracy.

Exemplary embodiments described herein may be used to optimize the light distribution between the receiver 12 and the wave front sensor (WFS) 14, such as the quadcell. In an exemplary embodiment, optics 17 are incorporated into the beam path before the quadcell to compensate for these dead zones. Ideally the light just outside of the receiver capture area would hit one or more of the plurality of detectors circumscribing the receiver 12. However, in practice, this is not possible as the fiber is surrounded by a cladding and the detectors include dead zones around the hole and between each other. The typical detector needs a dead zone around the active area for electrical reasons. Light hitting these areas are lost. For example, cladding for standard SMF and MMF is 125 μm, with cores of 9 μm and 50-62.5 μm, respectively.

Figure 5:
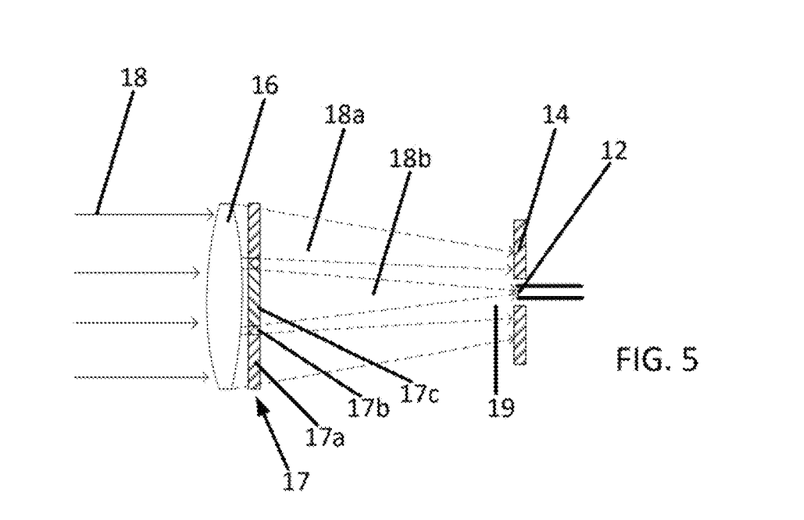
FIG. 5 illustrates an exaggerated representation of light propagation on exemplary system components as described herein.

FIG. 5 illustrates an exaggerated representation in which the lost light 19 falling on the cladding, the gap between fiber and detector, and/or on the dead zone of the detector is redirected to the active regions of the system components.

In an exemplary embodiment, the component 17 can have a central region 17c, an intermediate region 17b, and an exterior region 17a, in which each region is configured to direct or affect the passed light in different ways. The fore optics 16, 17, 17a, 17b, and 17c may be integrated or separated in any combination such that the optic includes one or more components. The central region comprises a first optical property to direct the light 18b onto an active region of the receiver 12. The central region may be a lens to focus the light onto the central portion of receptor 12. The intermediate region, if unaltered or had the same first optical characteristic, would pass light through the intermediate zone onto a dead zone of the system between the alignment sensor and receiver. The intermediate region may have a second optical property different from the first optical property such that the light passing through the intermediate region 19 is directed to an active zone of the receiver 12 or the alignment sensor 14. The fore optics includes an exterior region 17a having a third optical property. The third optical property may be different from the first optical property, the second optical property, or both first and second optical properties. The third optical property may also be the same as either of the first optical property or the second optical property. The exterior region of the fore optics is configured to direct light passing through the fore optic 18a onto an active area of the alignment sensor 14 circumscribing the receiver 12.

The exemplary embodiment illustrated in FIG. 5 has three regions. However, the fore optics may be configured with one, two regions or four or more regions. The system comprises fore optics configured to direct the received light onto active areas of the detector(s) used for alignment (or other function) and the receiver(s) used for receiving and analyzing the transmitted data without using a beam splitter, such that the incoming beam follows the same beam path. The fore optics may comprise a single integrated optical component configured with different regions or may comprise separate components to achieve the combined effects described herein.

Figure 6A:
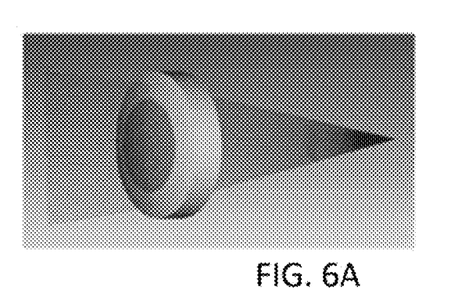
FIG. 6A illustrates an exemplary lens within a lens configuration according to embodiments described herein.
Figure 6B:
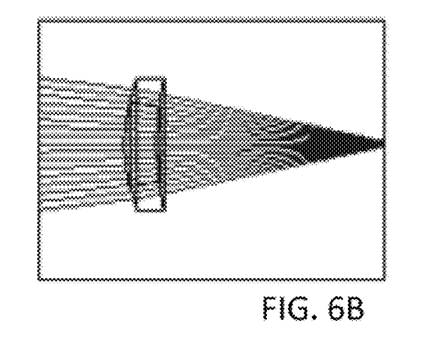
FIG. 6B illustrates exemplary light paths through the lens of FIG. 6A.
Figure 6C:
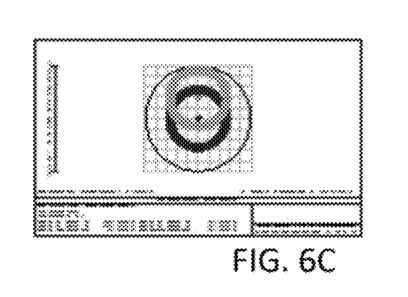
FIG. 6C illustrates the generated image as viewed at a focal plane as described herein.

FIG. 6A illustrates an exemplary lens within a lens modeled in Zemax, but any known methods to accomplish the same goal are included within the scope of the instant disclosure. As shown in FIG. 6A, an integrated, single lens is shown having different regions of different refraction to correspond to different focal points. The regions of the lens are configured to direct the received light onto the active portions of the receive and WFS. Other alternatives that may be used instead of separate optics or in conjunction therewith is diffractive coatings on a single lens or holographic phase screens may be used as would be understood by a person of skill in the art. FIG. 6B illustrates the light paths as the incoming light traverses the central portion of the lens. FIG. 6B illustrates the generated image as view at the focal plane of the central portion. As shown, the central portion focuses the light to approximately a point at the focal plane, while the exterior portion focuses the light in an annular ring corresponding to the WFS.

In an exemplary embodiment fore optics are incorporated into the system to redirect unused light between the active area of the fiber and sensors. In an exemplary embodiment, the fore optics includes radially spaced sections to direct light to active areas of the receiver and/or WFS. For example, a central region may be configured to direct light through the central region of the optic onto an interior or active area of the receiver (fiber or sensor), while an exterior region of the optic may be configured to direct the light through the exterior region onto an active area of one or more detectors (WFS) circumscribing the receiver.

The exemplary fore optics may also or alternatively be used to achieve different functions. For example, the fore optics may include a diffuser/phase screen to scrabble the scintillation structure of received light. In such a configuration, the fore optics associated with at least the exterior region 17a may be configured to disperse the passed light, such that gaps or obstructions of the light are averaged across adjacent portions of the light column. Accordingly, momentary effects of gaps in portions of the light column cause by scintillation will have reduced effects on system alignment or on detection at the alignment sensor. In an exemplary embodiment, the fore optics are configured to direct the light across a majority surface of the WFS and/or to disperse the signal across the area. Accordingly, exemplary embodiments may address non-symmetric structure interference caused by atmospheric scintillation and reduce its effect on the alignment sensor response.

In an exemplary embodiment, the fore optics 17 exterior portion 17a includes symmetric defocused images, overlapping each other at a chosen plane relative to the focal plane. What occurs is any structure in the beam will appear diametrically on the opposite side after going through focus. This is the essences of a differential curvature WFS. For example, a central portion 17c of the fore optics is configured to focus the incoming light at a focal plane. The exterior portion 17a comprises a bifocal optic that creates two images focused before and after the focal plane. The bifocal optic is configured such that the two images create, when observed at the focal plane, define an image at the WFS and define two overlapping mirror images of each other.

Figure 7A:
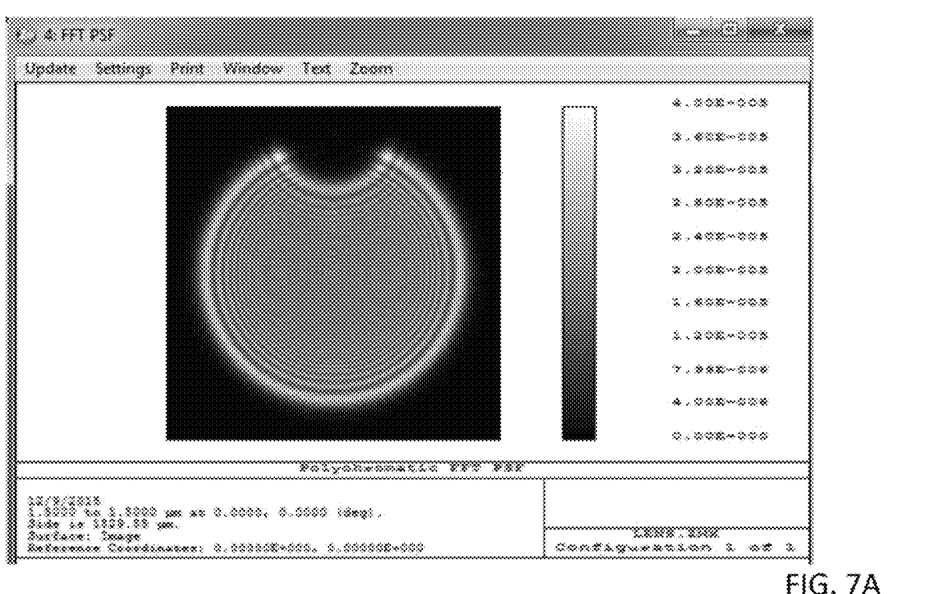
FIGS. 7A and 7B illustrate exemplary images of light on image planes inside and outside of the focal plane.
Figure 7B:
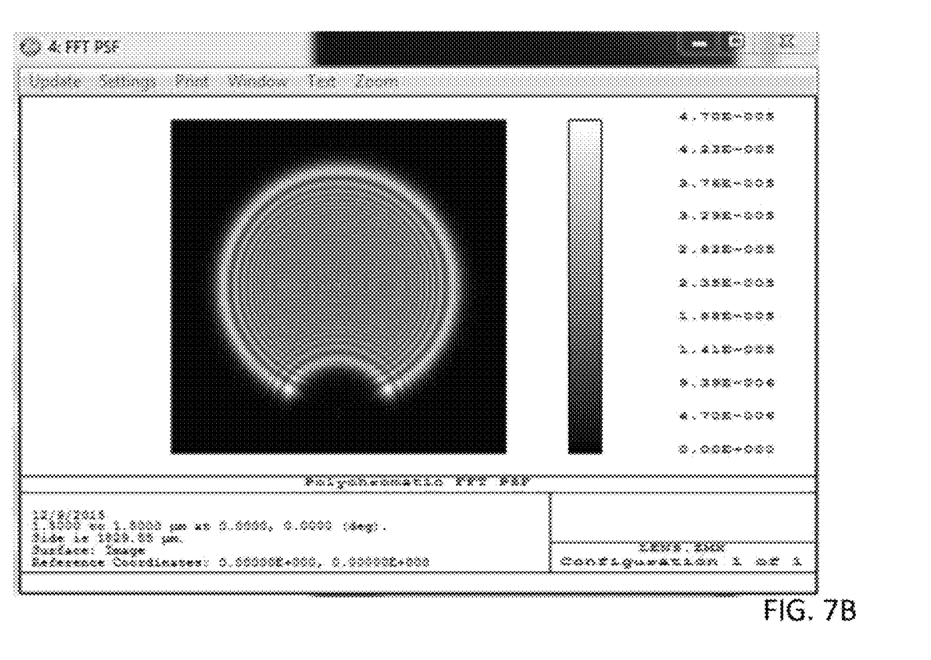

FIGS. 7A and 7B illustrate exemplary images of light on image planes inside and outside of the focal plane. As shown, the image has a notch on an upper portion of the light image. This could, for example, correspond to a gap caused by atmospheric interference in a transmitted optical signal. The notch appears in the image plane before the focal plane of the receiver. The image on the other side of the focal plane is a mirror image of the first image. Accordingly, as shown in FIG. 7B, the notch appears on a lower portion of the light image.

Figure 7C:
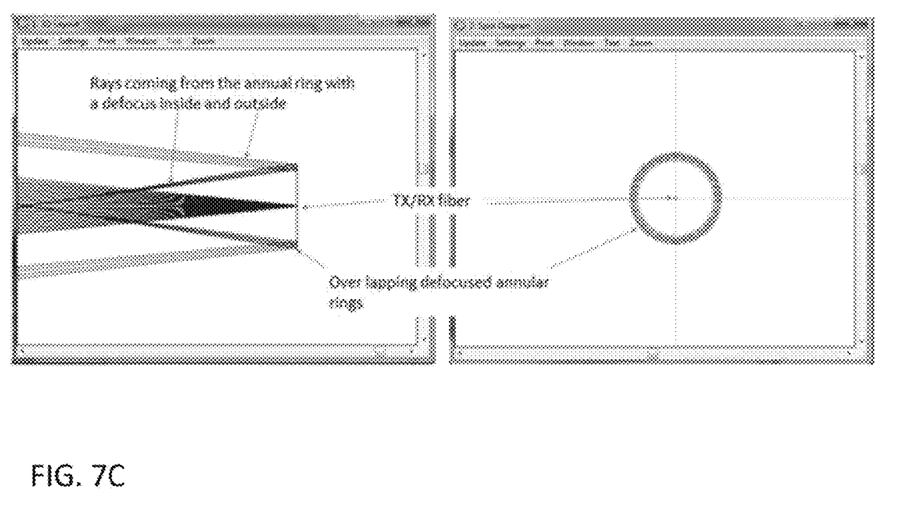
FIG. 7C illustrates an exemplary light structure at a net zero focus plane that nulls the pupil structure illustrated in FIGS. 7A and 7B.
Figure 8A:
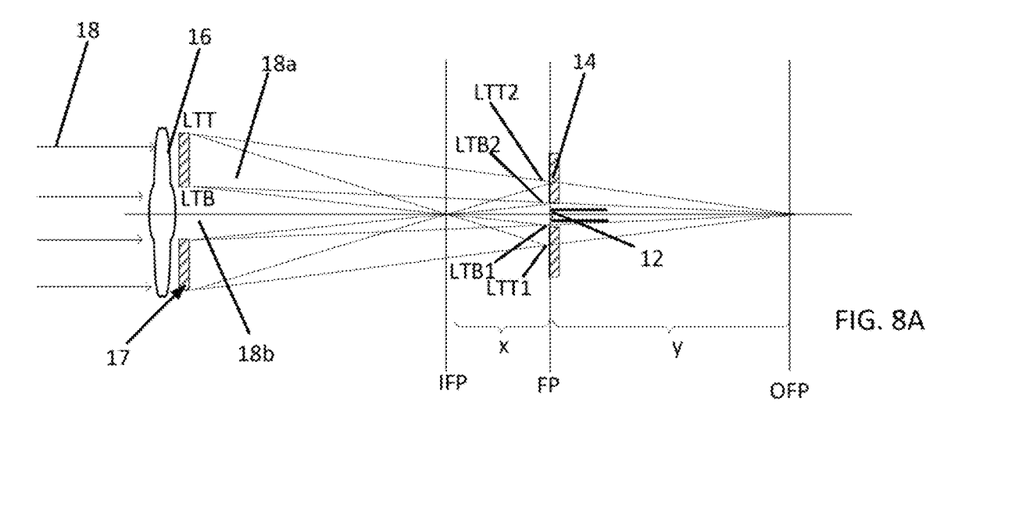
FIGS. 8A-8B illustrate exemplary arrangements showing exemplary light propagation paths resulting in exemplary bifocal planes relative to a reference focal plane.
Figure 8B:
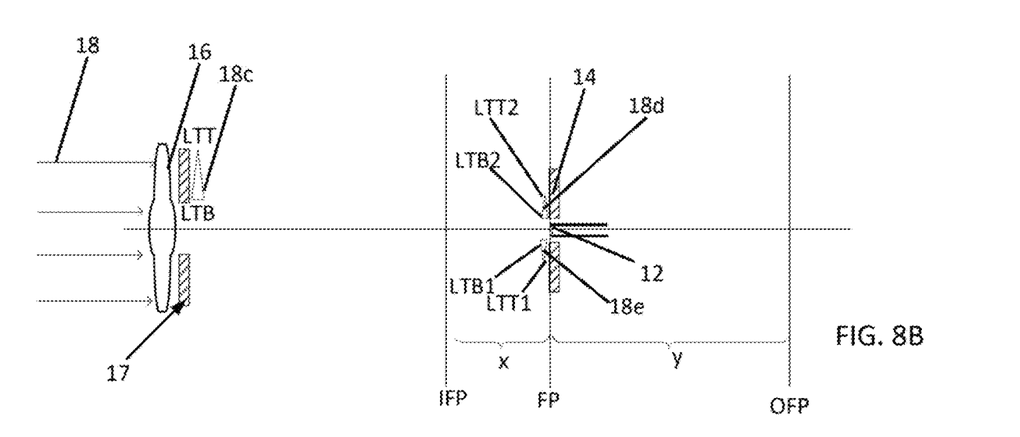

FIG. 7C illustrates an exemplary light structure at a net zero focus WFS that nulls the pupil structure illustrated in FIGS. 7A and 7B. FIGS. 8A-8B illustrate an exemplary arrangement showing exemplary light propagation paths resulting in the bifocal planes. As shown, light LTT passing through an upper portion of the fore optic is directed to an inside focal plane IFP and an outside focal plane OFP. Accordingly, when the light LTT is viewed at the focal plane of the central portion, or that of the receiver, the light originating at LTT is on opposing sides of the image at the focal plane. Specifically, the light propagating through the IFP ends up on a lower portion LTT1 of the image at the focal plane and the light propagating through the OFP ends up on an upper portion LTT2 of the image at the focal plane. Similarly, light originating from the bottom of the fore optic (or adjacent the aperture) LTB is also focus through the IFP and OFP. Light propagating from the LTB through the IFP ends up on an opposite side of the image, or on the upper portion LTB1 of the image at the focal plane, while light propagating through the OFP remains on the lower portion LTB2 of the image at the focal plane. Therefore, the light through the same annular side of the bifocal lens ends up on mirror sides as mirror images at the alignment sensor plane. As seen in FIG. 8B, if a light pattern 18c is seen through the upper portion of the bifocal fore optic, then the image is focused at 18d and 18e as mirror images across the alignment sensor 14 at focal plane FP.

Accordingly, in an exemplary embodiment, and optical configuration of fore optics(s) includes a central portion configured to focus light at a focal plane and an exterior annular optic configured as a bifocal optic having two focal planes on opposing sides of the focal plane of the central portion. The fore optics are configured such that mirror images of the exterior annular optic corresponds to the active area of the WFS and images two overlapping mirror images at the focal plane of the WFS. Accordingly, if the WFS is in the focal plane of the receiver, the inside focal plane and outside focal plane create an overlapping image at the focal plane and the inside and outside focal planes are likely equidistant from the focal plane. If the WFS sensor is out of plane from the receiver and/or focal plane, then the inside and outside focal planes are configured to create an overlapping mirror image at the WFS active surface, which may result in the inside and outside focal planes being at different distances from the focal plane. FIG. 8B illustrates such an exemplary configuration.

In the exemplary embodiments of FIGS. 8A and 8B, the fore optics include a focusing lens 16. The focusing lens may be configured to focus the entire passed light onto the focal plan FP. The focusing lens may also be segmented such that different regions of the focusing lens include different refractive properties for focusing the light in different directions and/or different planes as described herein. For example, a central portion may be configured to focus the light at a point on the focus plane to be received by receiver 12. An annular, exterior portion of the focusing lens may be configured to direct the light into an annular ring of either the focusing plane or another plane parallel to the focusing plane. The fore optics may also include a bifocal lens that defines two focal planes, IFP and OFP, on opposing sides of the focal plane of the focusing lens. As shown, the bifocal lens 17 is an annular ring commiserate in size and shape to the exterior region of the focusing lens. The bifocal lens may be any diffractive optical element having a dual or multiple foci. These fore optics 16, 17 may be separate or integrated components. For example, the bifocal element may be a diffraction coating printed onto the focal lens. The focal planes IFP and OFP may be equidistantly spaced from the FP focal plane or may be differently spaced.

In an exemplary optical configuration, the system comprises an objective that has zones that are used for Tx/Rx (Transmit/Receive) data. The objective therefore focuses a portion of the received light to a point on a focal plane. At the focal point on the focal plane is positioned a receiver. In an exemplary embodiment, the receiver is a terminal end of a multi-mode fiber. An annular ring outside of the maximum beam width (F) at the focal plane required by SMF (single mode fiber) and MMF (multi-mode fiber), can be used for a WFS (wave front sensor). The WFS can be of any number of sensing elements, and in our configuration surround the Tx/Rx common fiber in the image plane. Within this annular zone may be optical features that cause a defocus, both inside and outside of the focal plane, in an annular ring sized to match things like detector size, avoiding dead area where light is not collected by a sensor, etc.

In the simplest configuration, two annular rings are used with optical power to symmetrically defocus before and after the focal plane comprising the receiver where the focus conjugates the over lapping images with the center of the lens used for Tx and Rx. This could be mounted or be part of the lens construction. Different defocusing mechanisms may be used that have different advantages over others at the expense to develop and fabricate. For example, the defocus may be a two zone Fresnel lens attached to the objective; a custom Fresnel lens where every other lens groove has a different focus; a diffractive structure with the two optical focus; and/or holographic.

When these elements are combined in a simple configuration using a quadcell with a hole plus a single bidirectional fiber (SMF-MMF), you get a very simple and robust package concept that solves many issues of alignment and how to productize this to mass production.

The spot for linearity and dynamic range on a quadrant detector may be a top hat square that is 50% of the detector size, similar ranges are considered approximate to the 50% such as 40-60%. This configuration avoids problems with single spots that are small relative to the inter detector gap size and where multiple spots can create distortions in the transfer function. This configuration can play havoc with certain spot numbers and patterns to the point of no sensitivity with 2 spots in opposite quadrants. It is possible to see slope reversals and dead zones as this pattern is moved across the detector.

Accordingly, free space optical (FSO) applications have several challenges, including, for example:
1. Field of view (FOV) that naturally leads to small spots with limited dynamic range;
2. Using defocus causes tip/tilt aliasing from beam profile gradients and scintillation structure falling on the entrance aperture;
3. Using 2 detectors inside and outside of focus solves this problem but has many layers of complexity in non-common paths optical alignment and drift, and matching detector responses;
4. Use of random diffusers with coherent monochromatic light causes large speckles with low angles types and become very in efficient at higher order diffusing angles that scatter and lose light while becoming less sensitive to measure the tip/tilt signal.

Exemplary embodiments include a plurality of sensor along the same light path to perform different functions, such as detection and alignment. Exemplary embodiments use a quadcell with a hole to form an alignment sensor and an interior receiver for detection. An annular ring on an exterior portion of the objective or lens to focus the beam on the receiver will be seen on the quadcell. The inside annulus comes from the hole in the quadcell while the outside comes from the edges of the objective. Any angular change moves this outside edge shifting the balance of light on the quadrants.

Exemplary embodiments described herein include using a free space optical terminal in which a portion of the received beam is used for aligning the system and a separate portion of the beam is used for receiving, transmitting, and any combination thereof for a data signal. In an exemplary embodiment, the first portion of the beam used for alignment is an exterior portion circumscribing the second portion used for transmitting and/or receiving the data signal. Alternatively, the first portion may be a central portion, while the second portion may be a circumferential exterior portion of the same beam. In an exemplary embodiment, the system includes optical components within the first portion to reduce or prevent the alignment system from responding to scintillation or partial obstruction of the received signal. Accordingly, the optical components may include a diffuser, phase screen, bifocal optics or other combinations as described herein.

The method may include receiving an optical beam at the FSO terminal. The method includes positioning the beam such that a first portion falls on one or more detector(s) for aligning the terminal with the received beam (or any first system function), and a second portion falls on one or more receiver(s), such as a fiber optic or detection sensor, for detecting and/or directing the signal for analyzing a data signal carried on the received light. Method includes aligning the FSO terminal based on the signal from the one or more detectors for alignment. The method includes using system components or processing to account for signal scintillation and not realign the system based on a partially obstructed or incomplete received signal, but instead aligns the system based on a beam column direction from a remote node.

As shown and described, a quadcell is used to illustrate the plurality of detectors around the optical fiber or detection sensor. However, it should be understood that any combination of detectors may be positioned around the common receive/transmit path. The detectors may be of the same kind, or may be different. There are variants for the tilt sensor choice and a quadcell is not exclusive. Anything from normal quads to custom multi pixel detectors including focal plane arrays with random sub array read out may be used. Exemplary embodiments permit the light to pass through a hole, aperture, or space between detectors, or have a material that transmits the light used for data transmission.

"Substantially fill" or "substantial" is intended to mean greater than a majority, such as more than 75%. A majority is intended to mean 50%. Ranges are also used herein and are approximations only. Approximations are understood to be within the person of skill in the art. For example, when a series of detectors approximately fully surround or circumscribe an optical fiber, it is understood that natural dead space or gaps must accompany the areas between the detectors. These approximations are within the skill of the art to determine and may depend on system components, tolerances, wavelengths, system size, etc. Therefore, approximately fully surround is understood to have detectors positioned around the detectors to minimize the dead space, but would be dependent upon the kind and quantity of detectors selected. An optical beam path is understood to be the linear longitudinal direction of a propagated beam. Therefore, even when the interior, exterior, or intermediate portions of the beam are focused differently such that they are directed at the active zones of either the detector(s) or receiver(s), it is understood that the beam follows the same optical beam path.

Features described herein are exemplary only, and may be used in any combination or sub-combination as is desired for the application. Other features may be added or the above features may also be modified to achieve the objective of a user. For example, ranges, such as for wavelengths, may be redefined for particular applications, distances, environments, etc. Also, features may be removed and others redefined to accommodate the removal of a feature. Exemplary embodiments may be incorporated into or may use and combination of features from other systems. In an exemplary embodiment, the FSO terminal may use common optics for transmitting and receiving a data signal therefrom/ thereto. For example, U.S. application Ser. No. 14/608,166, titled "Data Retransmission for Atmospheric Free Space Optical Communication System," owned by the present applicant, and incorporated by reference in its entirety herein, discloses an FSO unit that may use a common aperture and optics for transmitting and receiving a data signal. Exemplary embodiments described herein may be used in conjunction with or replace the components for alignment and detecting. Other exemplary systems that may inform alternative configurations of the instant invention include, but are not limited to, those disclosed by U.S. application Ser. No. 14/608,133, filed Jan. 28, 2015, titled "Free Space Optical Communication Tracking with Electronic Boresight Compensation . . . ", U.S. application Ser. No. 14/608,166, filed Jan. 28, 2015, titled "Data Retransmission for Atmospheric Free Space Optical Communication System," U.S. Provisional Application No. 62/238,637, filed Oct. 7, 2015, titled "Fast Tracking Free Space Optical Module," and U.S. Provisional Application 62/266,710, filed Dec. 14, 2015, titled "Free Space Optical System with Common Transmit and Receive Paths," each of which are incorporated in their entirety herein.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

The invention claimed is:

1. A free space optical node configured to receive a received optical beam from and simultaneously transmit a transmitted optical beam to a remote free space optical node, comprising:
   a fiber coupled to receive and transmit electronics at an initial end, and comprising a terminal end of the fiber positioned at a focal plane, the fiber passing the transmit and received optical beams between the initial and terminal ends of the fiber;
   fore optics positioned along an optical path of at least a portion of the received optical beam, the fore optic creating a plurality of defocused images at a second plane, that overlap each other at the second plane; and
   a differential wave front sensor positioned at the second plane.

2. The free space optical node of claim 1, wherein the focal plane and the second plane are the same plane.

3. The free space optical node of claim 1, wherein the fore optics create symmetric defocused images both inside and outside the focal plane creating mirror overlapping images at the second plane.

4. The free space optical node of claim 1, wherein the fore optics comprise an annular ring with optical power to symmetrically defocus before and after the focal plane.

5. The free space optical node of claim 4, wherein the annular ring and a lens are integrated together with each other as part of a unitary lens construction.

6. The free space optical node of claim 4, wherein the annular rings are sized to match an active area of the differential wave front sensor.

7. The free space optical node of claim 1, wherein the wave front sensor surrounds the transmit/receive fiber in the focal plane.

8. The free space optical node of claim 1, wherein the fore optics comprise a diffractive optical element attached to an objective lens.

9. The free space optical node of claim 1, wherein the fore optics comprise a diffractive optical element having every other lens groove with a different focus.

10. The free space optical node of claim 1, wherein the fore optics are configured to generate a diffractive structure with two optical focus.

11. The free space optical node of claim 1, wherein the fore optics comprise a lens.

12. The free space optical node of claim 1, wherein the fore optics comprise two annular rings with respective optical powers to symmetrically defocus before and after the focal plane.

13. The free space optical node of claim 1, wherein the fore optics further comprise a central lens configured to focus a portion of the transmit/receive optical beam at the focal plane and onto the transmit/receive fiber.

* * * * *